(12) United States Patent
Zhou et al.

(10) Patent No.: US 8,471,865 B2
(45) Date of Patent: Jun. 25, 2013

(54) SYSTEM, METHOD AND APPARATUS FOR AN EDGE-PRESERVING SMOOTH FILTER FOR LOW POWER ARCHITECTURE

(75) Inventors: Jianping Zhou, Fremont, CA (US); Oscar Nestares, San Jose, CA (US); Sheethal Bhat, Hilsboro, OR (US); Madhu Athreya, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 12/753,350

(22) Filed: Apr. 2, 2010

(65) Prior Publication Data
US 2011/0242129 A1    Oct. 6, 2011

(51) Int. Cl.
*G09G 5/00*    (2006.01)
*G09G 5/02*    (2006.01)
*G06K 9/40*    (2006.01)
*G06K 9/36*    (2006.01)
*G06T 5/20*    (2006.01)

(52) U.S. Cl.
USPC ........... 345/611; 345/586; 345/606; 345/615; 382/254; 382/269; 382/274; 382/300

(58) Field of Classification Search
CPC ............................. G06T 5/002; G09G 3/2059
USPC ................. 345/418, 428, 581, 586, 589, 606, 345/611–612, 615–617, 643, 692; 382/254, 382/260, 263, 265–266, 269, 272, 274–276, 382/300
See application file for complete search history.

(56) References Cited

U.S. PATENT DOCUMENTS

| | | | |
|---|---|---|---|
| 7,675,524 B1 * | 3/2010 | Miller et al. | 345/586 |
| 2003/0190090 A1 * | 10/2003 | Beeman et al. | 382/284 |
| 2005/0135699 A1 * | 6/2005 | Anderson | 382/261 |
| 2005/0135700 A1 * | 6/2005 | Anderson | 382/261 |
| 2007/0140587 A1 * | 6/2007 | Wong et al. | 382/275 |
| 2008/0030526 A1 * | 2/2008 | Brown et al. | 345/694 |
| 2011/0221742 A1 * | 9/2011 | Deering et al. | 345/419 |

* cited by examiner

*Primary Examiner* — Wesner Sajous
(74) *Attorney, Agent, or Firm* — Kacvinsky Daisak PLLC

(57) ABSTRACT

Embodiments of an apparatus, system and method are described for an edge-preserving smooth filter for low power architecture. A weighted pixel sum may be determined based on a weight of a central pixel and a weight of one or more neighboring pixels. The weight sum for the central pixel may be set to a power of two. An output of the central pixel may be displayed based on the weight sum and the weighted pixel sum. Other embodiments are described and claimed.

14 Claims, 4 Drawing Sheets

SYSTEM, METHOD AND APPARATUS FOR AN EDGE-PRESERVING SMOOTH FILTER FOR LOW POWER ARCHITECTURE

BACKGROUND

Smooth filtering is widely used in photographic, video and display processing applications. Smooth filtering operations enable images to be denoised, sharpened and/or enhanced. To provide good image quality, smooth filtering operations need to preserve edges within an image. As a result, edge-preserving smooth filters have been implemented in digital signal processors (DSP), image signal processors (ISP), video processors, display processor, and graphics processing units (GPU). Existing edge-preserving smooth filters such as wavelets and bilateral filtering require intensive computation and high power consumption. Due to the intensive computation and high power consumption, existing edge-preserving smooth filters, such as bilateral filters, are not suitable for low power architectures or devices. Consequently, there exists a substantial need for edge-preserving smooth filters which do not require intensive computations and/or high power consumption.

DETAILED DESCRIPTION

The embodiments are generally directed to techniques designed to reduce power consumption without using intensive computations for edge-preserving smooth filters. Various embodiments provide techniques that include an edge-preserving smooth filter. A weighted pixel sum may be determined based on a weight of a central pixel and a weight of one or more neighboring pixels. The weight sum for the central pixel may be set to a power of two. An output of the central pixel may be displayed based on the weight sum and the weighted pixel sum. Other embodiments are described and claimed.

Edge-preserving smooth filters have used increasingly intensive computational algorithms, such as floating point and fixed-point division operations, which consume a large amount of power. In conventional computing systems, the power consumption was reduced by using low image quality smoothing filters. As such, there exists no efficient means today to limit power consumption of edge-preserving smooth filters while maintaining high performance and good image quality. Consequently, various embodiments described herein provide an efficient means to reduce power consumption while achieving high performance and good image quality using an edge-preserving smooth filter for low power architectures or devices. The various embodiments described herein may be more than ten times faster than existing filters such as, but not limited to, bilateral filters. The various embodiments described herein may consume ten times less power than existing filters such as, but not limited to, bilateral filters.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
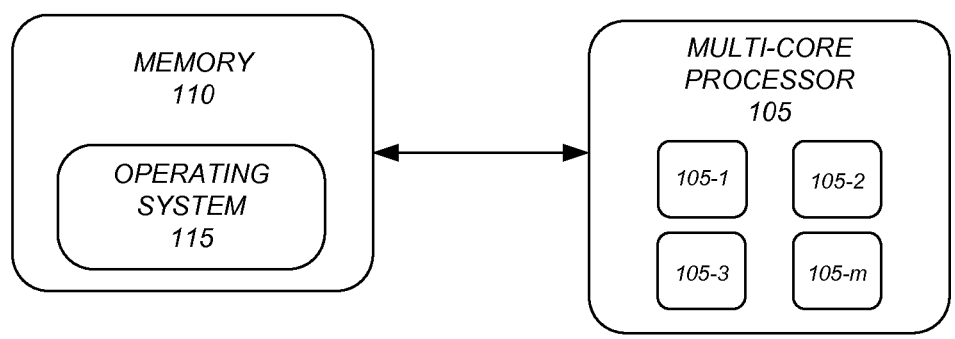
FIG. 1 illustrates one embodiment of an apparatus.

FIG. 1 illustrates one embodiment of an apparatus. FIG. 1 illustrates a block diagram of an apparatus 100. Apparatus 100 may comprise a computing system in some embodiments. As shown in FIG. 1, apparatus 100 comprises multiple elements, such as a multi-core processor 105 including cores 105-1-$m$, a memory 110 and an operating system 115. The embodiments, however, are not limited to the elements or the configuration shown in this figure.

In various embodiments, multi-core processor 105 may comprise a central processing unit may include one or more processor cores 105-1-$m$. The processor 105 may include any type of processing unit, such as, but not limited to, a computer processing unit (CPU), a multi-processing unit, a digital signal processor (DSP), a graphical processing unit (GPU) and an image signal processor. Alternatively, the multi-core processor may include a graphics accelerator or an integrated graphics processing portion. The present embodiments are not restricted by the architecture of the multi-core processor 105, so long as the multi-core processor 105 supports the modules and operations as described herein. The multi-core processor 105 may execute the various logical instructions according to the present embodiments.

In various embodiments, memory 110 may comprise any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, Random Access Memory (RAM) which may include, but is not limited to SRAM, DRAM and SDRAM, Read Only Memory (ROM) which may include, but is not limited to PROM, EPROM and EEPROM, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Operating system (OS) 115 may comprise an interface between various hardware components of apparatus 100 and a user in some embodiments. In various embodiments, OS 106 may be responsible for the management and coordination of activities and the sharing of the resources of the computing system 100. In some embodiments, OS 115 may act as a host for a variety of computing applications run on computing system 100. For example, OS 115 may comprise a Windows© operating system by Microsoft Corporation© of Redmond, Wash. in some embodiments. Other embodiments are described and claimed.

Figure 2:
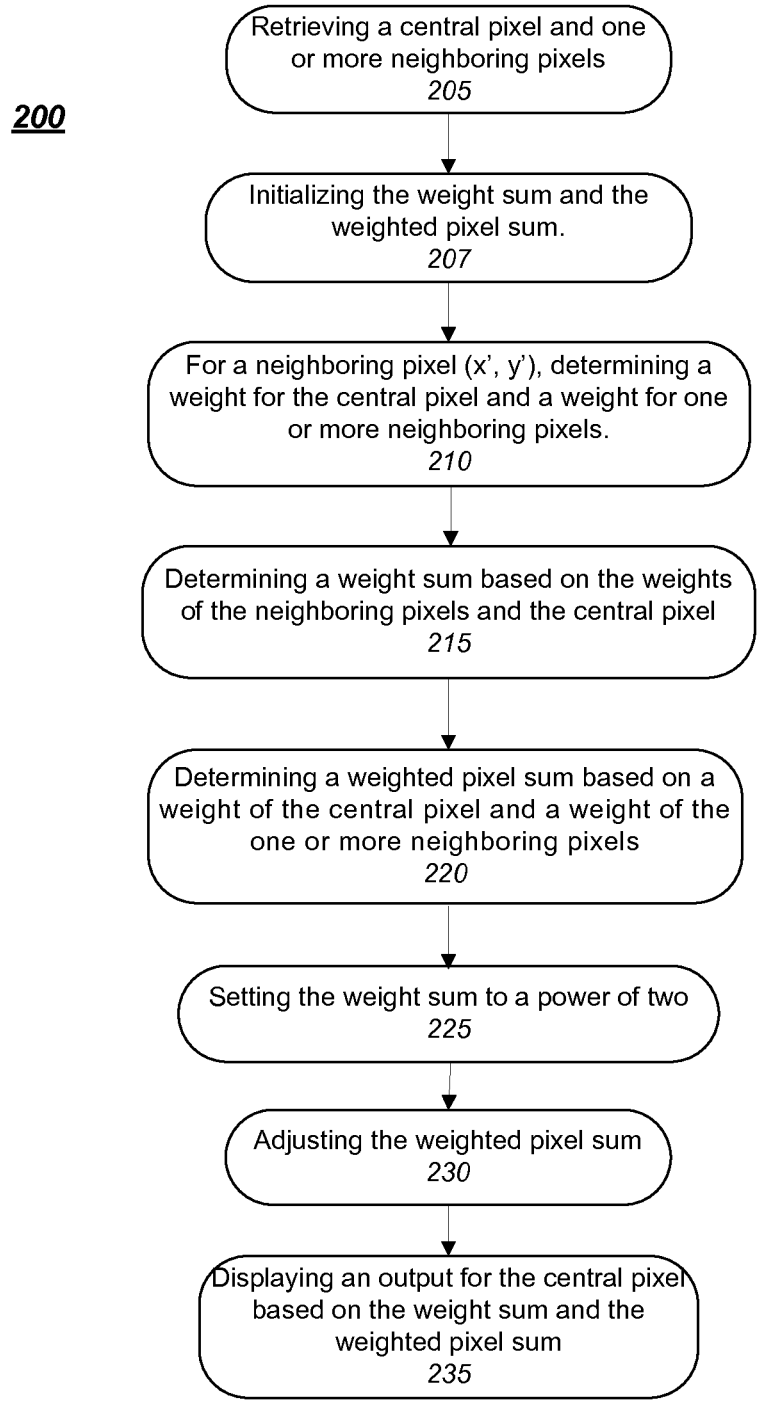
FIG. 2 illustrates one embodiment of a first logic diagram.

FIG. 2 illustrates one embodiment of a logic flow 200. The logic flow 200 may be performed by various systems and/or devices and may be implemented as hardware, software, firmware, and/or any combination thereof, as desired for a given set of design parameters or performance constraints. For example, one or more operations of the logic flow 200 may be implemented by executable programming or computer-readable instructions to be executed by a logic device (e.g., computer, processor). Logic flow 200 may describe the features described above with reference to apparatus 100.

In various embodiments, an image may be a graphic, a photograph and/or a video image. Based on the image neighbor window, parameters may be determined for the length and width. In an embodiment, the length and width of the neighbor window may be odd numbers. Using the length and width of the neighbor window, a shift number may be determined. In an embodiment, a shift number may be determined by rounding up to the nearest integer of the log base two of the neighbor window size. In an embodiment, the shift number may be the ceiling of the log base two of the width of the neighbor window times the length of the neighbor window. As show below in Equation 1, the neighbor window length and width may be represented as (nWindowX, nWindowY). The shift number may be represented as nShift.

$$n\text{Shift}=\text{ceiling}(\log_2(n\text{Window}X * n\text{Window}Y)) \quad \text{Equation 1}$$

An image may comprise pixels. A pixel is a single point in an image. For each pixel in the image, an output may be determined. In an embodiment, a central pixel and one or more neighboring pixels may be determined 205. A central pixel may be the input pixel for which an output pixel may be determined. The neighboring pixel may be a pixel surrounding the central pixel. For each central pixel input, nInput(x, y), an output of the central pixel, nOutput(x, y), may be determined.

Figure 3A:
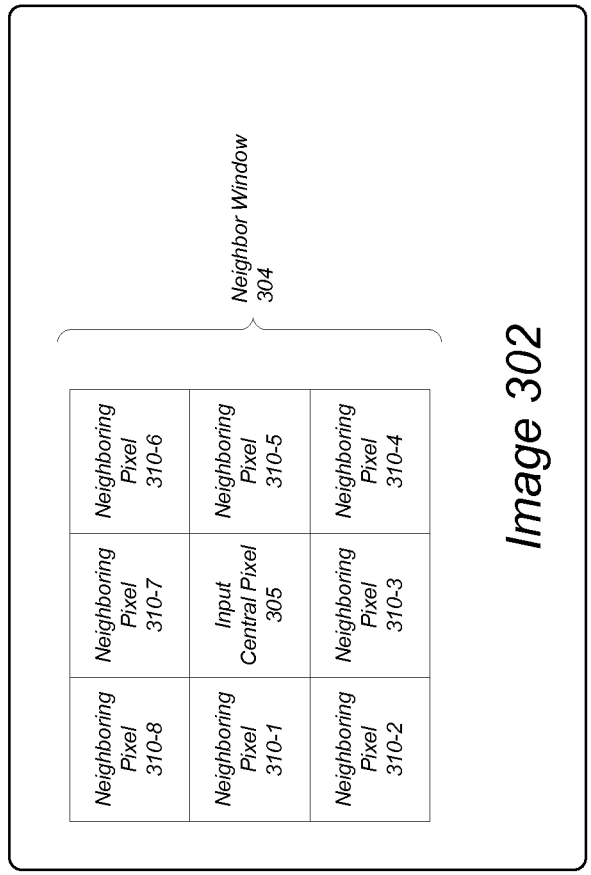
FIG. 3A illustrates one embodiment of pixels in an image.

FIG. 3A illustrates one embodiment of pixels in an image. As shown in FIG. 3A, the image 302 includes neighbor window 304 with an input central pixel 305. In an embodiment, the neighboring pixels 310-1-$m$ may be located in any position proximate, adjacent and/or adjoining to central pixel 305, as long as they are within the neighbor window of the central pixel 305. For example, neighboring pixel 310-5 may be adjacent to central pixel 305. In FIG. 3A, the length of the neighbor window may be 3 and the width of the neighbor window may be 3.

Referring back to FIG. 2, the neighboring pixel may be determined based on the central pixel and the size of the neighbor window. As shown below, the neighbor window (nWindowX, nWindowY) and the input of the central pixel nInput(x, y) may be used to determine the input of the neighboring pixel, nInput(x', y'). As shown below in Equations 2 and 3, the neighboring pixel (x', y') may be equal to:

$$\frac{x - (n\text{Window}X - 1)}{2} \leq x' \leq \frac{x + (n\text{Window}X - 1)}{2} \quad \text{Equation 2}$$

$$\frac{y - (n\text{Window}Y - 1)}{2} \leq y' \leq \frac{y + (n\text{Window}Y - 1)}{2} \quad \text{Equation 3}$$

In an embodiment, the central pixel may be a neighboring pixel of itself.

In an embodiment, the weight of the neighboring pixel may be initialized. In an embodiment, the weight of the neighboring pixel may be set to zero. In an embodiment, the weight sum may be the sum of the weights of all the neighboring pixels. As discussed below, each neighboring pixel will have a weight of either one or zero. In an embodiment, the weight sum may be initialized 207 and set to zero, as shown in Equation 4.

$$n\text{WeightSum}=0 \quad \text{Equation 4}$$

In an embodiment, a weighted pixel may be the input of the neighboring pixel times the weight of that pixel. In an embodiment, the weighted pixel sum may be the sum of the products of every neighboring pixel value and the corresponding weight of that neighboring pixel. The weighted pixel sum may be initialized 207. In an embodiment, the weighted pixel sum may be initialized and set zero, as shown in Equation 5.

$$n\text{WeightedPixelSum}=0 \quad \text{Equation 5}$$

For a neighboring pixel (x', y'), a neighboring pixel weight may be determined 210 based on the central pixel and the neighboring pixel. A threshold may be represented as nThreshold. In an embodiment, a threshold may be determined for the image. The threshold may be the contrast between a first pixel and a neighboring second pixel. In an embodiment, the threshold may be used to determine when a pixel comprises an edge. In an embodiment, adjustments may be made to the threshold to increase a picture contrast. In an embodiment, the threshold may be between about 0 and about 15 intensity, if the pixel value is in between 0-255.

In an embodiment, it may be determined whether the absolute value of the input of the neighboring pixel minus input of the central pixel is less than a threshold. The absolute value of the input of the neighboring pixel minus the input of the central pixel may be equal to or greater than the threshold, as shown in Equation 6.

$$|n\text{Input}(x',y') - n\text{Input}(x,y)| \geq n\text{Threshold} \quad \text{Equation 6}$$

In an embodiment, if the absolute value of the input of the neighboring pixel minus the input of the central pixel is equal to or greater than the threshold, then there is a high contrast between the central pixel and the neighboring pixel. In an embodiment, if the absolute value of the input of the neighboring pixel minus the input of the central pixel is greater than the threshold, then there is a high contrast between the central pixel and the neighboring pixel. In an embodiment, the central pixel may be an edge within the image. If the absolute value of the input of the neighboring pixel minus the input of the central pixel is greater than or equal to the threshold, then no smoothing may occur and the weight of the neighboring pixel may be set to zero.

In an embodiment, the absolute value of the neighboring pixel minus the central pixel may be less than the threshold, as shown in Equation 7.

$$|n\text{Input}(x',y') - n\text{Input}(x,y)| < n\text{Threshold} \quad \text{Equation 7}$$

If the absolute value of the input of the neighboring pixel minus the input of the central pixel is less than the threshold, then the central pixel may be smoothed by the neighboring pixel. When the absolute value of the input of the neighboring pixel minus the input of the central pixel is less than the threshold, the weight of the neighboring pixel may be set to one. A weight sum may be determined 215 based on the weights of the neighboring pixels and the central pixel. The new weight sum may be calculated as shown in Equation 8.

$$n\text{WeightSum}=n\text{WeightSum}+1 \quad \text{Equation 8}$$

Since the weight of the neighboring pixel is set to one when the absolute value of the input of the neighboring pixel minus the input of the central pixel is less than the threshold, a weighted pixel may be determined. A weighted pixel may be the input of the neighboring pixel times the weight of that pixel. A weighted pixel sum may be determined 220 based on a weight of a central pixel and a weight of one or more neighboring pixels. As shown in Equation 9, the weighted pixel may be equal to the input (i.e., the intensity) of the neighboring pixel times the weight of the neighboring pixel.

$$n\text{WeightedPixel}=n\text{Input}(x',y') * \text{weight}(x',y') \quad \text{Equation 9}$$

As the weight of the neighboring pixel may be equal to one when the absolute value of the input of the neighboring pixel minus the input of the central pixel is less than the threshold, the weighted pixel sum of the central pixel may be determined to be the weighted pixel sum plus a neighboring pixel (x', y'). In an embodiment, the weighted pixel sum may be the sum of all the inputs of the neighboring pixels that have a weight of one. In an embodiment, the weighted pixel sum may include the weight and input (i.e., intensity) of the central pixel. The weighted pixel sum may be calculated, as shown in Equation 10.

$$n\text{WeightedPixelSum}=n\text{WeightedPixelSum}+n\text{Input}(x', y') \quad \text{Equation 10}$$

In an embodiment, the weight sum may be set 225 to a power of two. In an embodiment, the weight sum may be set to a target weight sum. The target weight sum may be 2 to the shift number, as shown in Equation 11a.

$$\text{TargetWeightSum}=2^{n\text{Shift}} \quad \text{Equation 11a}$$

$$\text{IncreaseAmount}=2^{n\text{Shift}}-n\text{WeightSum} \quad \text{Equation 11b}$$

$$n\text{WeightSum}=n\text{WeightSum}+\text{IncreaseAmount} \quad \text{Equation 11c}$$

An increase amount between the weight sum, from Equation 8, and the target weight sum may be determined as shown in Equation 11b. In an embodiment, the weight sum may be set equal to the weight sum plus the increase amount, as shown in Equation 11c. In an embodiment, the weight sum may be set equal to the target weight sum. In an embodiment, the weight sum may be set equal to a power of two.

By using the equation above to determine the weight sum, the weight sum may be set to a power of two. As the weight sum is a power of two, floating point operations and/or integer division operations may be avoided when determining the output for the central pixel.

In an embodiment, the central pixel weight may be adjusted. In an embodiment, the central pixel weight may be set to a new weight based on the new weight sum. In an embodiment, the central pixel weight may be set equal to the central pixel weight plus the increase amount, as shown in Equation 12.

$$\text{Weight}(x,y)=\text{Weight}(x,y)+\text{IncreaseAmount} \quad \text{Equation 12}$$

In an embodiment, $2^{n\text{Shift}}-n\text{WeightSum}$ may be used to determine a target central pixel weight and increase amount for the output of the central pixel. In an embodiment, the target weight sum may be two to the shift number. In order to ensure that the weight sum is a power of 2, the weight sum calculated in Equation 8 may be subtracted from the target weight sum to determine an increase amount. The increase amount may then be added to the central pixel weight to determine the new central pixel weight to be used in the output. For example, if the shift number is 3, then the target weight sum may be 8 (i.e., $2^3$). If the current weight sum (i.e., the weight sum calculated in Equation 8) is 6, then the increase amount may be 2 (i.e., 8−6). The central pixel weight may be increased to 3 (i.e., 2+1).

In an embodiment, the weighted pixel sum may be adjusted 230. In an embodiment, the weighted pixel sum may be adjusted because of the new weight of the central pixel. In an embodiment, the weighted pixel sum may be set equal to the weighted pixel sum, from Equation 9, plus the increase amount times the input of the central pixel. In an embodiment, the weighted pixel sum of the central pixel may be set equal to the weighted pixel sum of the central pixel plus two to the shift number minus the weight sum of the neighboring pixels times the input of the central pixel, as shown in Equation 13 below.

$$n\text{WeightedPixelSum}=n\text{WeightedPixelSum}+(2^{n\text{Shift}}-n\text{WeightSum})*n\text{Input}(x,y) \quad \text{Equation 13}$$

In an embodiment, an output of the central pixel may be determined 235 based on the weighted pixel sum of the central pixel. In an embodiment, the output of the central pixel may be the weighted pixel sum divided by the weight sum. Since the weight sum is equal to two to the shift number, the output of the central pixel may be the weighted pixel sum moved by the shift number, as shown in Equation 14 below.

$$n\text{Output}(x,y)=n\text{WeightedPixelSum}>>n\text{Shift} \quad \text{Equation 14}$$

Using the example above, the weighted pixel sum may be right shifted by 3 since 8 is the target weight sum and $2^3$ is 8.

Figure 3B:
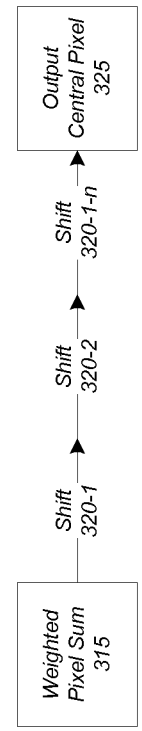
FIG. 3B illustrates one embodiment of an output pixel.

FIG. 3B illustrates one embodiment of an output pixel. As shown in FIG. 3B, output central pixel 325 may be right shifted 320-1-n from the weighted pixel sum 315 of the central pixel. As discussed in the example above, the output central pixel 325 may be right shifted 320-1-n by three from the weighted pixel sum 315.

The embodiments discussed allow edge-preserving smooth filtering for low power architectures. The output for the central pixel may be determined using a low power architecture and/or device. By creating a weight sum which may be a power of two, the division of the weighted pixel sum by the weight sum may be simplified into a right shift. The embodiments discussed above may not require floating point operations or fixed-point division operations.

Referring back to FIG. 2, it should be understood that in some embodiments that logic flow 200 may be implemented or arranged to perform tasks in parallel, including processing a plurality of threads and controlling a plurality of cores at substantially the same time. Moreover, it should also be understood that the logic flow 200 is only one example of a logic flow and that different numbers, orders and/or arrangements of the operations described in logic flow 200 could be implemented and still fall within the described embodiments. Other embodiments are described and claimed.

Figure 4:
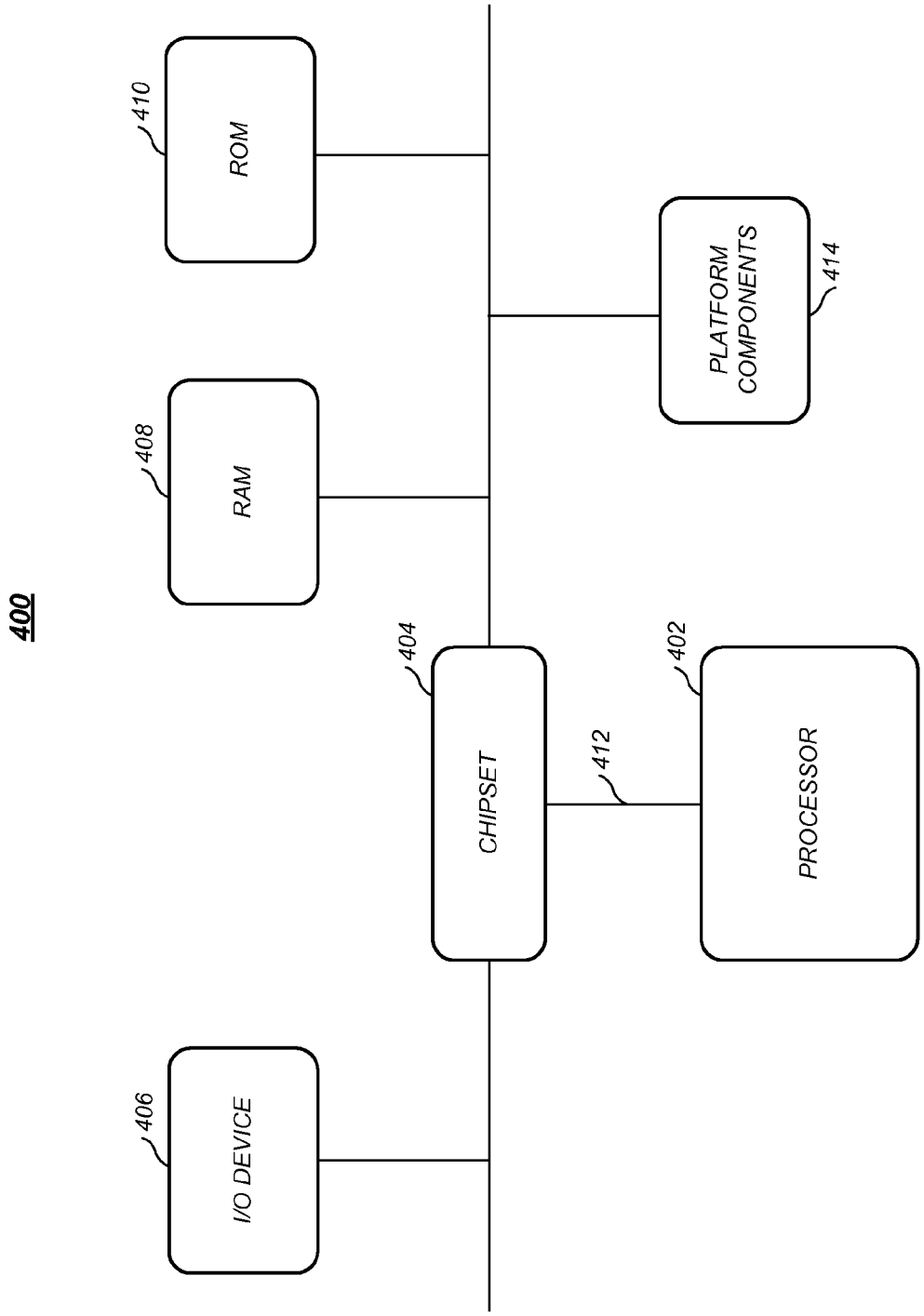
FIG. 4 illustrates one embodiment of a system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, central processing unit (CPU), multi-processing unit, a reduced instruction set computer (RISC), a processor that have a pipeline, a complex instruction set computer (CISC), a digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a computer-readable storage medium containing instructions that when executed by a processor enable a system to:
    determine a weighted pixel sum based on a weight of a central pixel and a weight of one or more neighboring pixels;
    set a weight for a neighboring pixel to zero when a difference between the neighboring pixel and the central pixel is greater than a threshold or to one when the difference between the neighboring pixel and the central pixel is less than the threshold;
    set a weight sum for the central pixel to a power of two; and
    display an output of the central pixel based on the weighted pixel sum and the weight sum.

2. The article of claim 1, comprising instructions that when executed enable the system to determine a neighboring pixel weight of a neighboring pixel.

3. The article of claim 2, comprising instructions that when executed enable the system to determine the neighboring pixel weight based on a difference between the central pixel and the neighboring pixel.

4. The article of claim 1 comprising instructions that when executed enable the system to:
    determine an increase amount based on a prior weight sum; and
    add the increase amount to the weight of the central pixel.

5. The article of claim 1, comprising instructions that when executed enable the system to set the weight sum to a power of two to a shift.

6. The article of claim 1, comprising instructions that when executed enable the system to determine when the central pixel comprises an edge.

7. The article of claim 1, comprising instructions that when executed enable the system to adjust a threshold to increase a contrast between a neighboring pixel and the central pixel.

8. The article of claim 1, comprising instructions that when executed enable the system to:
    set the weight of the central pixel to a new weight;
    adjust the weighted pixel sum based on the new weight of the central pixel; and
    shift the weighted pixel sum.

9. A computer-implemented method, comprising:
    determining a weighted pixel sum based on a weight of a central pixel and a weight of one or more neighboring pixels;
    setting a weight for a neighboring pixel to one when the difference between the neighboring pixel and the central pixel is less than a threshold or to zero when the difference between the neighboring pixel and the central pixel is greater than a threshold;
    setting a weight sum for the central pixel to a power of two; and
    displaying an output of the central pixel based on the weight sum and the weighted pixel sum.

10. The computer-implemented method of claim 9, comprising
    determining an increase amount based on a prior weight sum; and
    adding the increase amount to the weight of the central pixel.

11. The computer-implemented method of claim 9, comprising comprises:
    setting the weight of the central pixel to a new weight;
    adjusting the weighted pixel sum based on the new weight of the central pixel; and
    shifting the weighted pixel sum.

12. A system, comprising:
    a multi-core processor; and
    a filter operative to determine a weighted pixel sum based on a weight of a central pixel and a weight of one or more neighboring pixels, set a weight for a neighboring pixel to zero when the difference between the neighboring pixel and the central pixel is greater than a threshold or to zero when the difference between the neighboring pixel and the central pixel is less than a threshold, set a weight sum of the central pixel to a power of two, and display an output of the central pixel based on the weight sum and the weighted pixel sum.

13. The system of claim 12, the filter operative to determine when the central pixel comprises an edge.

14. The system of claim 12, the filter operative to adjust a threshold to increase a contrast between a neighboring pixel and the central pixel.

* * * * *

UNITED STATES PATENT AND TRADEMARK OFFICE
CERTIFICATE OF CORRECTION

PATENT NO. : 8,471,865 B2
APPLICATION NO. : 12/753350
DATED : June 25, 2013
INVENTOR(S) : Jianping Zhou et al.

Page 1 of 1

It is certified that error appears in the above-identified patent and that said Letters Patent is hereby corrected as shown below:

On the Title page, in item (75), in column 1, in "Inventor", line 3, delete "Hilsboro," and insert -- Hillsboro, --, therefor.

In the Claims:

In column 10, line 30-31, in claim 11, delete "comprising comprises:" and insert -- comprising: --, therefor.

Signed and Sealed this
Seventeenth Day of September, 2013

Teresa Stanek Rea
*Deputy Director of the United States Patent and Trademark Office*